United States Patent
Oguri

(10) Patent No.: US 9,956,955 B2
(45) Date of Patent: May 1, 2018

(54) DRIVING ASSISTANCE SYSTEM

(71) Applicant: Haruki Oguri, Toyota (JP)

(72) Inventor: Haruki Oguri, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 62 days.

(21) Appl. No.: 14/785,455

(22) PCT Filed: May 9, 2013

(86) PCT No.: PCT/JP2013/063068
§ 371 (c)(1),
(2) Date: Oct. 19, 2015

(87) PCT Pub. No.: WO2014/181434
PCT Pub. Date: Nov. 13, 2014

(65) Prior Publication Data
US 2016/0075330 A1    Mar. 17, 2016

(51) Int. Cl.
*B60W 30/09*    (2012.01)
*G08G 1/0967*    (2006.01)
(Continued)

(52) U.S. Cl.
CPC .............. *B60W 30/09* (2013.01); *B60T 7/12* (2013.01); *B60T 7/18* (2013.01); *B60T 7/22* (2013.01);
(Continued)

(58) Field of Classification Search
CPC ...... B60W 30/09; B60W 40/04; B60W 10/18; B60W 10/04; B60W 2710/18;
(Continued)

(56) References Cited

U.S. PATENT DOCUMENTS 8,155,868 B1 * 4/2012 Xing .................... G07C 5/0808
340/439
8,560,197 B2 * 10/2013 Sato ........................ G07C 5/04
701/408
(Continued)

FOREIGN PATENT DOCUMENTS

CN    101727741 A    6/2010
JP    2006 72936    3/2006
(Continued)

OTHER PUBLICATIONS

International Search Report dated Jul. 23, 2013 in PCT/JP13/063068 Filed May 9, 2013.

*Primary Examiner* — Frederick M Brushaber
(74) *Attorney, Agent, or Firm* — Oblon, McClelland, Maier & Neustadt, L.L.P.

(57) ABSTRACT

A driving assistance system includes a stop assistance controller, an assistance necessity determining unit, and a determining position arithmetic unit. The stop assistance controller is configured to perform stop assistance of an own vehicle. The assistance necessity determining unit is configured to determine whether it is necessary to perform the stop assistance of the own vehicle based on a stop determining position where it is determined whether to perform the stop assistance of the own vehicle and a predicted display state of a traffic signal at a time the own vehicle arrives at the stop determining position. The determining position arithmetic unit is configured to determine the stop determining position according to a current display state of the traffic signal.

10 Claims, 3 Drawing Sheets

(51) Int. Cl.
*B60T 7/18* (2006.01)
*B60T 7/22* (2006.01)
*B60T 7/12* (2006.01)
*B60W 10/04* (2006.01)
*B60W 10/18* (2012.01)
*B60W 40/04* (2006.01)
*G08G 1/0962* (2006.01)

(52) U.S. Cl.
CPC ............ *B60W 10/04* (2013.01); *B60W 10/18* (2013.01); *B60W 40/04* (2013.01); *G08G 1/09626* (2013.01); *G08G 1/096716* (2013.01); *G08G 1/096725* (2013.01); *G08G 1/096741* (2013.01); *G08G 1/096783* (2013.01); *B60W 2550/22* (2013.01); *B60W 2710/18* (2013.01); *B60W 2720/10* (2013.01)

(58) Field of Classification Search
CPC ........ B60W 2550/22; G08G 1/096716; G08G 1/09626; G08G 1/096783; G08G 1/096741; G08G 1/096725; B60T 7/12; B60T 7/18; B60T 7/22
See application file for complete search history.

(56) References Cited

U.S. PATENT DOCUMENTS

| | | | |
|---|---|---|---|
| 9,035,797 B2 * | 5/2015 | Varma | G08G 1/096783 340/905 |
| 2009/0237269 A1 * | 9/2009 | Okugi | B60R 1/00 340/901 |
| 2010/0004839 A1 * | 1/2010 | Yokoyama | G08G 1/052 701/70 |
| 2010/0079306 A1 * | 4/2010 | Liu | G08G 1/01 340/909 |
| 2010/0109908 A1 | 5/2010 | Miura | |
| 2013/0035828 A1 * | 2/2013 | Tamura | B60P 1/162 701/50 |
| 2013/0110315 A1 * | 5/2013 | Ogawa | G08G 1/096716 701/1 |
| 2013/0110316 A1 * | 5/2013 | Ogawa | G08G 1/096716 701/1 |
| 2013/0211688 A1 * | 8/2013 | Oguri | B60W 30/143 701/70 |

FOREIGN PATENT DOCUMENTS

| | | |
|---|---|---|
| JP | 2009 122804 | 6/2009 |
| WO | WO 2012/053106 A1 | 4/2012 |

* cited by examiner

DRIVING ASSISTANCE SYSTEM

FIELD

The present invention relates to a driving assistance system which performs stop assistance on a route of an own vehicle.

BACKGROUND

This type of driving assistance system is conventionally known. For example, Patent Literature 1 described later discloses technology of calculating time until arrival of an own vehicle at an intersection based on a distance between the own vehicle and the intersection and a vehicle speed of the own vehicle and transmitting a stop request to a brake system of the own vehicle so as to stop the own vehicle before the intersection when it is predicted that a traffic signal when the own vehicle arrives at the intersection is in an entry prohibition state (with red signal light). Patent Literature 2 described later discloses technology used in this type of driving assistance system, the technology of calculating maximum predicted required time to a stop position of the own vehicle and predicting a display state of the traffic signal when the maximum predicted required time elapses in consideration of an error upper limit of a current position of the own vehicle in addition to the distance to the intersection (between the current position of the own vehicle and the stop position before the intersection) and the vehicle speed of the own vehicle.

CITATION LIST

Patent Literature

Patent Literature 1: Japanese Laid-open Patent Publication No. 2006-072936
Patent Literature 2: Japanese Laid-open Patent Publication No. 2009-122804

SUMMARY

Technical Problem

There is a case in which a traffic signal switches from an entry prohibition state to an entry permission state (with blue signal light) at the same as arrival of an own vehicle at an intersection or immediately before the arrival at the intersection. In this case, it is predicted that a display state of the traffic signal is the entry permission state when the own vehicle arrives at the intersection, so that stop assistance is not performed supposing that deceleration and stop for the intersection are not required in the conventional technology. However, in a case in which the display of the traffic signal switches in this manner, a signal aspect until the arrival of the own vehicle at the intersection or immediately before the arrival at the intersection is the entry prohibition state, so that a driver who visually recognizes the display state of the traffic signal until then might feel uncomfortable with a state in which the stop assistance is not performed before the intersection.

Therefore, an object of the present invention is to improve a disadvantage of such a conventional example and provide a driving assistance system which does not provide a sense of discomfort to the driver even when timing when the own vehicle arrives at the intersection and display switching timing of the traffic signal overlap with each other.

Solution to Problem

To achieve the object, the present invention includes: a stop assistance controller configured to perform stop assistance of an own vehicle; an assistance necessity determining unit configured to determine whether it is necessary to perform the stop assistance of the own vehicle based on a stop determining position where it is determined whether to perform the stop assistance of the own vehicle and a predicted display state of a traffic signal at a time the own vehicle arrives at the stop determining position; and a determining position arithmetic unit configured to determine the stop determining position according to a current display state of the traffic signal.

It is preferable that the determining position arithmetic unit is configured to change the stop determining position to a position a predetermined distance before a position of a stop line at a time the current display state of the traffic signal is an entry prohibition state.

Moreover, it is preferable that the determining position arithmetic unit is configured to change the stop determining position more to a position before the position of the stop line as a current vehicle speed of the own vehicle is higher.

Moreover, it is preferable that the determining position arithmetic unit is configured to change the stop determining position to a position where a driver who recognizes the display state starts decelerating operation at a time the current display state of the traffic signal is an entry prohibition state.

Moreover, to achieve the object, the present invention includes: a signal information obtaining unit configured to obtain signal information of a traffic signal; a stop assistance controller configured to perform stop assistance of an own vehicle based on the signal information; and an assistance necessity determining unit configured to determine whether it is necessary to perform the stop assistance of the own vehicle, wherein the assistance necessity determining unit is configured to permit execution of the stop assistance of the own vehicle at a time a current display state of the traffic signal is an entry prohibition state and at a time the display state of the traffic signal changes from the entry prohibition state to an entry permission state at a time the own vehicle passes through an intersection where the traffic signal is installed.

It is preferable that the time when the own vehicle passes through the intersection includes time when the own vehicle arrives at a position of a stop line before the traffic signal, time when the own vehicle arrives at a position a predetermined distance before the stop line, and time when the own vehicle arrives at a position a predetermined distance beyond the stop line.

Advantageous Effects of Invention

A driving assistance system according to the present invention determines a stop determining position of stop assistance of an own vehicle according to a current display state of a traffic signal, so that this determines whether it is necessary to perform the stop assistance according to the determined stop determining position. For example, when the current display state of the traffic signal is an entry prohibition state, the stop determining position is changed to a side closer to the own vehicle than a stop line in a location where the traffic signal is installed. The driving assistance system according to the present invention permits execution of the stop assistance of the own vehicle when the current display state of the traffic signal is the entry prohibition state and when the display state of the traffic signal changes from the entry prohibition state to an entry permission state when the own vehicle passes through an intersection where the traffic signal is installed. Therefore, the driving assistance system may perform the stop assistance also under condition that the display state of the traffic signal switches from the entry prohibition state to the entry permission state at the same time as arrival of the own vehicle at the location where the traffic signal is installed or under condition that the display state of the traffic signal switches from the entry prohibition state to the entry permission state immediately before or after the arrival at the location where the traffic signal is installed, so that this may inhibit a sense of discomfort of the driver.

DESCRIPTION OF EMBODIMENTS

An embodiment of a driving assistance system according to the present invention is hereinafter described in detail with reference to the drawings. Meanwhile, the invention is not limited by the embodiment.

Embodiment

An embodiment of a driving assistance system according to the present invention is described with reference to FIGS. 1 to 3.

Figure 1:
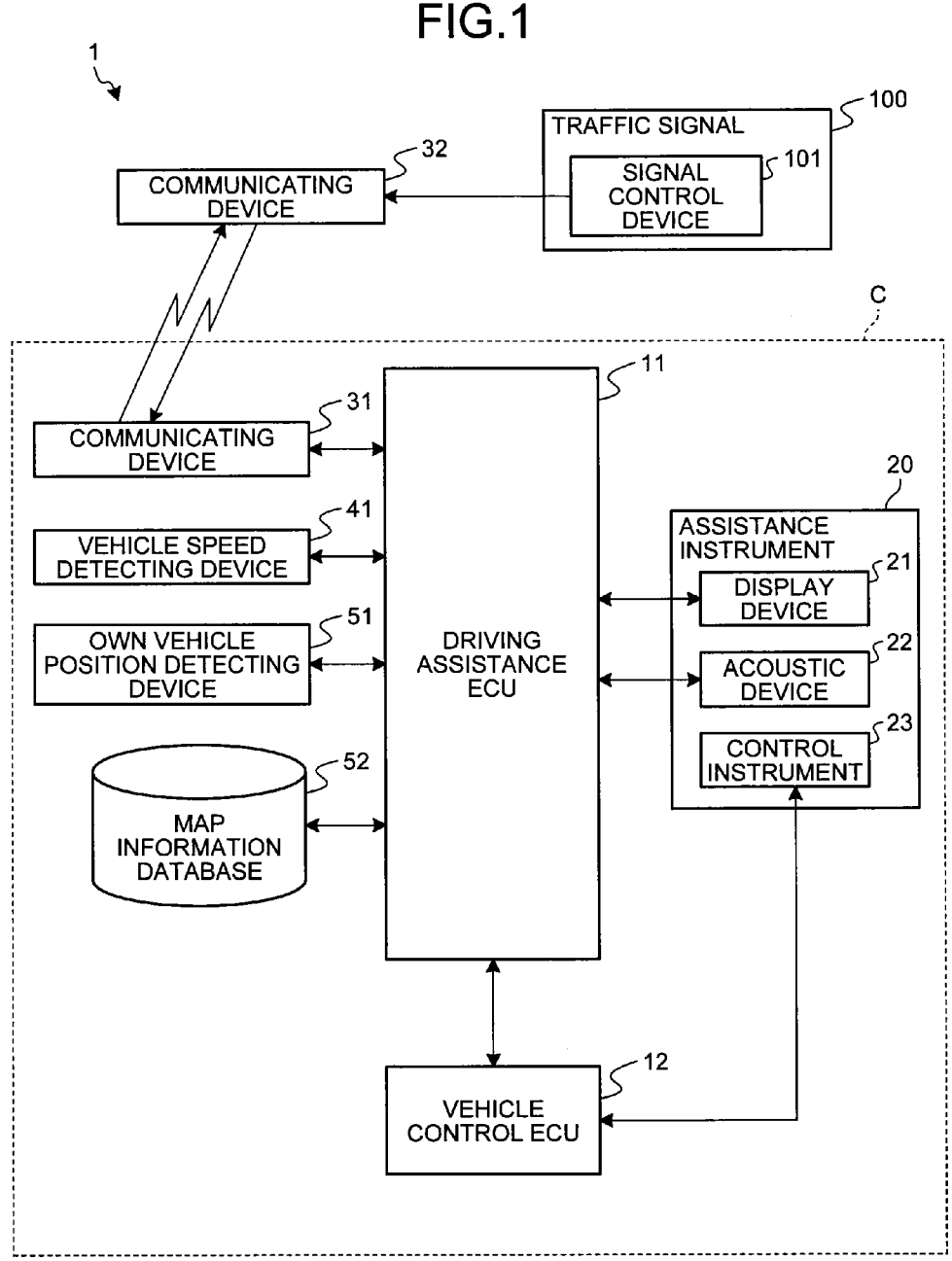
FIG. 1 is a view illustrating a configuration of a driving assistance system according to the present invention.

A reference sign 1 in FIG. 1 represents the driving assistance system of this embodiment.

In the driving assistance system 1, an electronic control unit for performing driving assistance (hereinafter, referred to as "driving assistance ECU") 11 is provided on a vehicle. The driving assistance ECU 11 performs stop assistance control of an own vehicle C for a location where a traffic signal 100 is installed (for example, a position of a stop line) such as an intersection on a route.

The stop assistance control is intended to mean assistance to urge a driver to stop the own vehicle C by stimulating visual sense and acoustic sense, for example. Furthermore, the stop assistance control also includes braking force control performed by the vehicle in order to stop the own vehicle C. In the driving assistance system 1, an assistance instrument 20 used when the stop assistance control is performed is provided on the vehicle. The assistance instrument 20 may include a display device 21 and an acoustic device 22 provided in a vehicle chamber, for example. A stop assistance controller of the driving assistance ECU 11 allows the display device 21 to display visual information to urge the driver to stop the own vehicle C. The stop assistance controller allows the acoustic device 22 to output acoustic information to urge the driver to stop the own vehicle C. Furthermore, a control instrument 23 of the vehicle such as a braking device which generates braking force on the own vehicle C may also be used as the assistance instrument 20.

In this case, the stop assistance controller sends an instruction to an electronic control unit for vehicle control (hereinafter, referred to as "vehicle control ECU") 12 and allows a vehicle controller of the vehicle control ECU 12 to control the control instrument 23. The stop assistance control is performed based on signal information of the traffic signal 100 described later.

In the driving assistance system 1, a communicating device 31 which receives external information is provided on the vehicle. The communicating device 31 externally receives at least the signal information of the traffic signal 100 which is present on the route of the own vehicle C. Especially, it is only required that the communicating device 31 receives at least the signal information of the traffic signal 100 the closest to the own vehicle C out of the traffic signals 100 on the route. The communicating device 31 may also be configured so as to be able to externally receive information other than this or configured so as to be able to externally transmit the information from the own vehicle C. The communicating device 31 starts communicating by an instruction of a signal information obtaining unit of the driving assistance ECU 11 to transmit the externally received signal information to the driving assistance ECU 11, for example.

A signal control device 101 in the traffic signal 100 grasps the signal information. The illustrated signal control device 101 controls the traffic signal 100 and transmits the signal information thereof to a communicating device 32. The communicating device 32 is a road-side communication instrument installed in the location where the traffic signal 100 is installed. The communicating device 32 may also transmit traffic regulation information and the like in the location where the traffic signal 100 is installed and the vicinity thereof in addition to the signal information.

The signal control device 101 transmits display information of the traffic signal 100 to the communicating device 32 as the signal information. The display information of the traffic signal 100 is intended to mean information indicating a display state of the traffic signal 100 (hereinafter, also referred to as "signal state"). The signal state specifically includes an entry prohibition state in which vehicle entry beyond the traffic signal 100 is prohibited such as a state with a red signal light, for example, and an entry permission state in which the vehicle entry beyond the traffic signal 100 is permitted such as a state with a blue signal light, for example. An entry attention state to invite attention about the vehicle entry beyond the traffic signal 100 such as a state with a yellow signal light, for example, is also known as the signal state. Therefore, the display information of the traffic signal 100 includes information indicating the entry prohibition state (hereinafter, referred to as "entry prohibition information"), information indicating the entry permission state (hereinafter, referred to as "entry permission information"), information indicating the entry attention state (hereinafter, referred to as "entry attention information") and the like, for example. Furthermore, the signal information transmitted to the communicating device 32 also includes identification information of the traffic signal 100. Meanwhile, a place beyond the traffic signal 100 herein includes not only a road beyond the traffic signal 100 at the time of straight travel but also the road beyond the same at the time of right-turn or left-turn.

Herein, when the display information transmitted to the communicating device 32 is only current display information of the traffic signal 100 (so-called signal aspect information), the signal control device 101 also transmits information of signal state switching interval (hereinafter, referred to as "display switching interval") together with the display information to the communicating device 32 as the signal information. This is for allowing the own vehicle C which receives the signal information to grasp change in the display information with respect to displacement of an own vehicle position. Therefore, the signal control device 101 may also transmit, together with the signal aspect information, the display information during predetermined time thereafter (for example, upcoming few seconds) as the signal information to the communicating device 32.

The communicating device 32 on the road side continuously transmits at least the signal information received from the signal control device 101 to a predetermined transmission range. Therefore, the communicating device 31 receives the information transmitted by the communicating device 32 on the road side to transmit to the driving assistance ECU 11 of the own vehicle C when the own vehicle C enters the transmission range. In this manner, the driving assistance ECU 11 obtains the signal information of the traffic signal 100 which is present on the route of the own vehicle C. Herein, the signal control device 101 transmits the signal information to the communicating device 32 each time the signal state changes. Therefore, in the driving assistance system 1, the communicating device 32 on the road side transmits updated new signal information each time the signal state changes, so that the vehicle in the transmission range may receive the new signal information.

In this illustration, the communicating device 31 of the own vehicle C and the communicating device 32 on the road side are the communication instruments in which an optical beacon, a radio wave medium and the like are used; the communicating devices 31 and 32 perform so-called road-to-vehicle communication to transmit/receive the signal information. It is also possible to interpose an external server between the communicating devices 31 and 32. There is a case in which another vehicle preceding the own vehicle C has the signal information. Therefore, the communicating device 31 of the own vehicle C may receive the signal information of another vehicle by inter-vehicle communication and vehicle-to-road-to-vehicle communication.

The driving assistance system 1 performs or prohibits the stop assistance control of the own vehicle C by using the received signal information.

Specifically, an assistance necessity determining unit of the driving assistance ECU 11 determines whether it is necessary to perform the stop assistance of the own vehicle based on a predicted result of the display state of the traffic signal 100 (hereinafter, referred to as "predicted display state") when the own vehicle C arrives at a stop determining position of the stop assistance of the own vehicle C.

The stop determining position is intended to mean a position for determining whether it is necessary to perform the stop assistance of the own vehicle C, the position which is present between a current own vehicle position and the position of the stop line on the route of the own vehicle C. The driving assistance ECU 11 is provided with a determining position arithmetic unit which determines the stop determining position. The determining position arithmetic unit determines the stop determining position according to a current signal state. For example, when the current signal state is the entry permission state or the entry attention state, the position of the stop line in the location where the traffic signal 100 is installed is defined as the stop determining position as usual. On the other hand, when the current signal state is the entry prohibition state, the stop determining position is changed to a position a predetermined distance before the position of the stop line. When a current status is the entry prohibition state, it is preferable to consider a current vehicle speed of the own vehicle C and the stop determining position is changed more to a position a predetermined distance before the position of the stop line as the vehicle speed is higher. Specifically, when the current signal state is the entry prohibition state, the stop determining position is determined in the following manner.

When recognizing that the signal state is the entry prohibition state, the driver starts decelerating operation when an interval between the own vehicle C and the stop line becomes as short as a predetermined interval. The decelerating operation includes not only brake operation performed by the driver (for example, stepping operation of a brake pedal) but also operation other than the brake operation regarding deceleration of the vehicle such as operation in which the driver takes his/her foot off an accelerator pedal and down-shift operation of a transmission). Therefore, intervention of the stop assistance in a position where the driver starts the decelerating operation (hereinafter, referred to as "decelerating operation starting position") or around the decelerating operation starting position provides little sense of discomfort to the driver; this instead is of high convenience.

Figure 2:
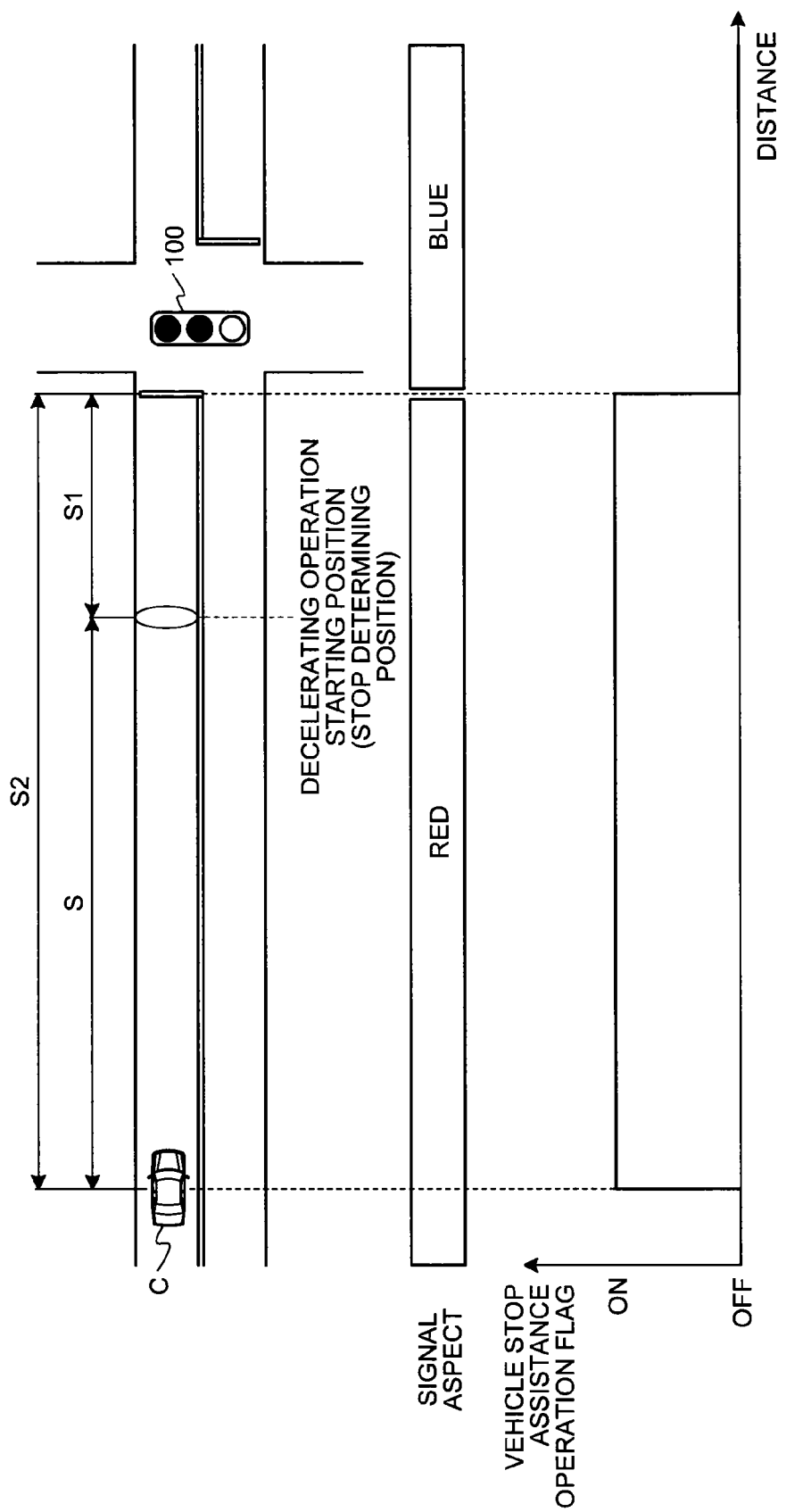
FIG. 2 is a view illustrating an application example of the driving assistance system according to the present invention.
Figure 3:
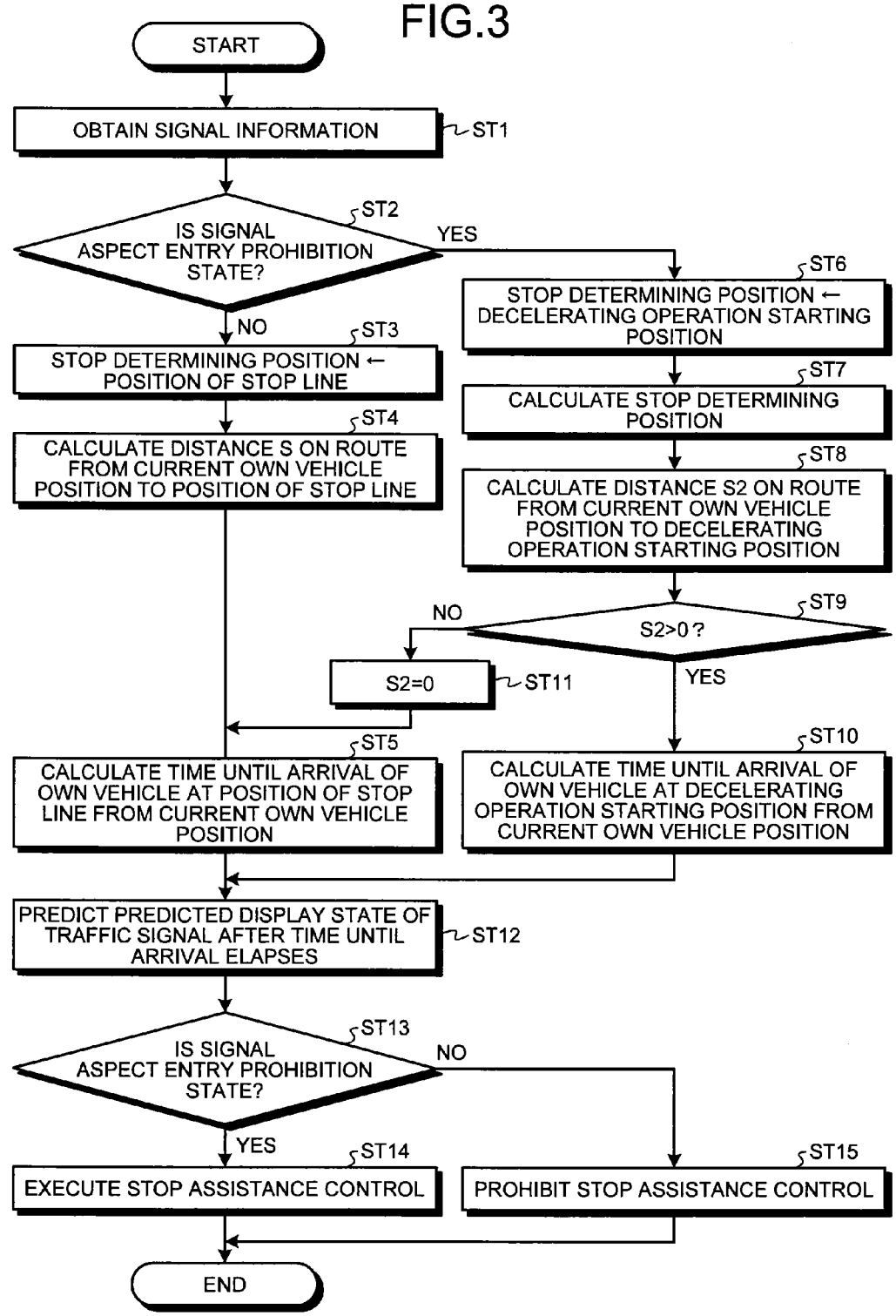
FIG. 3 is a flowchart illustrating arithmetic process operation of the driving assistance system according to the present invention.

Therefore, when the current signal state is the entry prohibition state, the determining position arithmetic unit is allowed to calculate the decelerating operation starting position, thereby defining the decelerating operation starting position as the stop determining position (FIG. 2). The decelerating operation starting position is calculated in the following manner, for example.

A distance S1 on the route from the decelerating operation starting position to the position of the stop line corresponds to the above-described predetermined distance when the stop determining position is changed and may be calculated by using following equation 1, for example. In this equation, "V" represents the current vehicle speed of the own vehicle C. "G" represents a supposed value of deceleration (<0) of the own vehicle C between the decelerating operation starting position and the position of the stop line. Also, "td" represents response time between time when the driver recognizes the entry prohibition state and time when the driver starts the decelerating operation. Meanwhile, the response time td is the time when the driver immediately performs the decelerating operation after recognizing the entry prohibition state.

$$S1 = td*V + (-V^2/2G) \tag{1}$$

Herein, the current vehicle speed V of the own vehicle C detected by a vehicle speed detecting device 41 is used as the vehicle speed of the own vehicle C in the decelerating operation starting position supposing that the own vehicle C does not accelerate/decelerate between the current own vehicle position and the decelerating operation starting position. Herein, a case in which the driver stops the own vehicle C at the stop line is described as an example, so that the vehicle speed of the own vehicle C at the stop line is set to 0. When normal brake operation and brake operation in rapid braking other than the normal brake operation are compared to each other, the distance S1 from the decelerating operation starting position to the position of the stop line becomes shorter in the brake operation in the rapid braking than in the normal brake operation. Herein, inhibition of the sense of discomfort of the driver when there is no intervention of the stop assistance is obtained, so that a value when the normal brake operation is performed is used as the deceleration G. The deceleration G may be determined based on statistics and the like of the brake operation of a general driver in the past, for example. That is to say, the determining position arithmetic unit in this illustration may obtain the distance S1 from the decelerating operation starting position to the position of the stop line based on the current vehicle speed V of the own vehicle C, thereby grasping the decelerating operation starting position.

The driving assistance ECU 11 is provided with a signal state predicting unit which performs arithmetic operation of the predicted display state of the traffic signal 100 when the own vehicle C arrives at the decelerating operation starting position (stop determining position). The signal state predicting unit predicts the predicted display state of the traffic signal 100 when the own vehicle C arrives at the decelerating operation starting position (stop determining position) based on the current signal information of the traffic signal 100 (display information, information of display switching interval, and identification information of the traffic signal 100), the position of the own vehicle C, and the vehicle speed of the own vehicle C. When predicting, the signal state predicting unit calculates time elapsed until the own vehicle C arrives at the decelerating operation starting position (stop determining position) from the current position based on the current vehicle speed V of the own vehicle C and a distance S2 between the current position of the own vehicle C and the decelerating operation starting position (stop determining position). The signal state predicting unit predicts the predicted display state of the traffic signal 100 when the own vehicle C arrives at the decelerating operation starting position (stop determining position) by obtaining the signal state after time until arrival elapses from the current time based on the time until arrival and the current signal information of the traffic signal 100 (information of signal aspect and display switching interval).

In the driving assistance system 1, an own vehicle position detecting device 51 which detects the position where the own vehicle C is present and a map information database 52 in which map information of a road which the vehicle may pass and map information of the traffic signal 100 are at least stored are provided on the vehicle. According to this, the signal state predicting unit may know a current own vehicle position on the map. A so-called global positioning system (GPS) may be used as the own vehicle position detecting device 51. Herein, the map information of the road also includes information of the position of the stop line, a temporarily stop position and the like. Furthermore, the map information of the traffic signal 100 includes identification information of each traffic signal 100. The identification information is associated with the identification information of the traffic signal 100 in the above-described signal information. Therefore, the signal state predicting unit may obtain positional information of the stop line in the location where the traffic signal 100 is installed based on the received identification information of the traffic signal 100 and the map information of the traffic signal 100 in the map information database 52. Meanwhile, a car navigation system provided with such own vehicle position detecting device 51 and map information database 52 may be herein used.

When the current signal state is the entry permission state or the entry attention state, the assistance necessity determining unit determines that it is necessary to perform the stop assistance of the own vehicle when the predicted display state is the entry prohibition state but determines that it is not necessary to perform the stop assistance of the own vehicle when the predicted display state also is the entry permission state or the entry attention state based on the predicted display state of the traffic signal 100 when the own vehicle C arrives at the position of the stop line as the stop determining position. When the current signal state is the entry prohibition state, the assistance necessity determining unit determines that it is necessary to perform the stop assistance of the own vehicle when the predicted display state is the entry prohibition state but determines that it is not necessary to perform the stop assistance of the own vehicle when the predicted display state is the entry permission state or the entry attention state based on the predicted display state of the traffic signal 100 when the own vehicle C arrives at the decelerating operation starting position as the stop determining position. The assistance necessity determining unit sets a vehicle stop assistance operation flag when it is necessary to perform the stop assistance of the own vehicle and resets the vehicle stop assistance operation flag when it is necessary to perform the stop assistance of the own vehicle (FIG. 2).

The stop assistance controller executes the stop assistance control when the vehicle stop assistance operation flag is set and prohibits execution of the stop assistance control when the vehicle stop assistance operation flag is reset. The stop assistance control may be started when the own vehicle C actually arrives at the decelerating operation starting position or when the own vehicle C actually arrives at a position around the decelerating operation starting position, for example, regardless of the current signal state. The stop assistance control may also be started from the current own vehicle position regardless of the current signal state.

When the current signal state is the entry prohibition state, the signal state is more likely to switch from the entry prohibition state to the entry permission state at the same time as the arrival of the own vehicle C at the location where the traffic signal 100 is installed or immediately before or after the arrival at the location where the traffic signal 100 is installed as compared to a case in which the signal state is the state other than the entry prohibition state (entry permission state or entry attention state). However, in the driving assistance system 1, when the current signal state is the entry prohibition state, the stop determining position is changed to a side closer to the own vehicle C as compared to the case in which the signal state is the state other than the entry prohibition state and it is determined whether it is necessary to perform the stop assistance control according to the predicted display state of the traffic signal 100 when it is supposed that the own vehicle C arrives at the changed stop determining position. Therefore, the driving assistance system 1 does not provide a sense of discomfort to the driver because the stop assistance control is executed when the own vehicle C arrives at the decelerating operation starting position or the position around the decelerating operation starting position also under condition that the display state of the traffic signal 100 switches from the entry prohibition state to the entry permission state at the same time as the arrival of the own vehicle C at the location where the traffic signal 100 is installed or condition that the display state of the traffic signal 100 switches from the entry prohibition state to the entry permission state immediately before or after the arrival at the location where the traffic signal 100 is installed.

Arithmetic processing operation regarding the stop assistance in the driving assistance system 1 is hereinafter described with reference to a flowchart in FIG. 3.

When the determining position arithmetic unit of the driving assistance ECU 11 externally obtains the signal information of the traffic signal 100 on the route (step ST1), this determines whether the current display state of the traffic signal 100 (signal aspect) is the entry prohibition state based on the display information of the traffic signal 100 in the signal information (step ST2).

The determining position arithmetic unit defines the position of the stop line in the location where the traffic signal 100 is installed as the stop determining position when determining that the current signal state is the state other than the entry prohibition state (step ST3). Therefore, in this case, the signal state predicting unit of the driving assistance ECU 11 calculates a distance S on the route from the current own vehicle position to the position of the stop line (step ST4). The current own vehicle position and the position of the stop line may be obtained by using the identification information of the traffic signal 100 in the received signal information, the own vehicle position detecting device 51, and the map information database 52 as described above. Therefore, the signal state predicting unit may calculate the distance S on the route based on the current own vehicle position, the position of the stop line, and the map information of the road in the map information database 52.

Subsequently, the signal state predicting unit calculates the time until arrival of the own vehicle C at the position of the stop line from the current own vehicle position based on the distance S on the route and the current vehicle speed of the own vehicle C (step ST5).

On the other hand, when the current signal state is determined to be the entry prohibition state at step ST2, the position calculating unit defines the decelerating operation starting position of the driver as the stop determining position (step ST6) and obtains the stop determining position (step ST7). At that time, the determining position arithmetic unit calculates the distance S1 on the route from the decelerating operation starting position to the position of the stop line based on the current vehicle speed V of the own vehicle C and equation 1 described above and obtains the decelerating operation starting position on the route.

Thereafter, the signal state predicting unit calculates the distance S2 on the route from the current own vehicle position to the stop determining position (decelerating operation starting position) (step ST8). The distance S2 is obtained based on following equation 2.

$$S2=S-S1 \quad (2)$$

The signal state predicting unit determines whether the distance S2 on the route is a positive value (step ST9).

The signal state predicting unit calculates the time until arrival of the own vehicle C at the stop determining position (decelerating operation starting position) from the current own vehicle position based on the distance S2 and the current vehicle speed of the own vehicle C when the distance S2 on the route is the positive value (S2>0) (step ST10). On the other hand, when the distance S2 on the route is not larger than 0 (S2≤0), the signal state predicting unit sets the distance S2 to 0 (step ST11) and shifts to step ST5 to obtain the time until arrival of the own vehicle C at the position of the stop line from the current own vehicle position.

After calculating the time until arrival of the own vehicle C at the stop determining position at step ST5 or ST9, the signal state predicting unit predicts the predicted display state of the traffic signal 100 when the own vehicle C arrives at the stop determining position, that is to say, the predicted display state of the traffic signal 100 after the time until arrival elapses based on the time until arrival and the signal information received at step ST1 (step ST12).

The assistance necessity determining unit determines whether the predicted display state of the traffic signal 100 is the entry prohibition state (step ST13). When the predicted display state is the entry prohibition state, the assistance necessity determining unit determines that it is necessary to perform the stop assistance control, and the stop assistance controller executes the stop assistance control (step ST14). At that time, the assistance necessity determining unit sets the vehicle stop assistance operation flag (FIG. 2). The vehicle stop assistance operation flag is reset when the own vehicle C arrives at the position of the stop line, for example. On the other hand, when the predicted display state is the state other than the entry prohibition state, the assistance necessity determining unit determines that it is not necessary to perform the stop assistance control, prohibits the stop assistance control (step ST15), and finishes this arithmetic process.

Herein, in the driving assistance system 1, it is also possible to allow the calculated decelerating operation starting position (stop determining position) to be learned together with vehicle speed information of the own vehicle C to be used at the time of next travel of the same road at a similar vehicle speed. A learned result is stored in the map information database 52 together with the map information of the road, for example. According to this, a step of calculating the decelerating operation starting position may be omitted at the time of the next travel of the same road, so that arithmetic processing time may be shortened.

In the illustration described heretofore, the time until arrival of the own vehicle C at the stop determining position is obtained and the predicted display state of the traffic signal 100 after the time until arrival elapses is obtained. The signal state predicting unit may predict time when the own vehicle C passes through the stop determining position based on the time until arrival and time information in the system and obtain the predicted display state of the traffic signal 100 at predicted passing time in place of this. Meanwhile, the time information in the system is intended to mean time information of the own vehicle C, time information received by the GPS and the like, for example.

Furthermore, it is also possible that the assistance necessity determining unit permits execution of the stop assistance of the own vehicle when the current display state of the traffic signal 100 is the entry prohibition state and when the display state of the traffic signal 100 changes from the entry prohibition state to the entry permission state when the own vehicle C thereafter passes through the intersection when the traffic signal 100 is installed. That is to say, the assistance necessity determining unit determines the current display state of the traffic signal 100 a predetermined distance before the location where the traffic signal 100 is installed based on the obtained signal information, and when the display state at the time of determination is the entry prohibition state, determines the display state when the own vehicle C travels the predetermined distance or before or after this. As described above, the signal information includes not only the display information of the traffic signal 100 but also the information of the display switching interval. Therefore, the assistance necessity determining unit may grasp the display state of the traffic signal 100 when the own vehicle C passes through the intersection. The assistance necessity determining unit permits the execution of the stop assistance of the own vehicle when the current display state of the traffic signal 100 is the entry prohibition state and when the display state of the traffic signal 100 when the own vehicle C thereafter passes through the intersection changes from the entry prohibition state to the entry permission state. Therefore, the driving assistance system 1 may perform the stop assistance under condition that the display state of the traffic signal 100 switches from the entry prohibition state to the entry permission state at the same time as the arrival of the own vehicle C at the location where the traffic signal 100 is installed and under condition that the display state of the traffic signal 100 switches from the entry prohibition state to the entry permission state immediately before or after the arrival at the location where the traffic signal 100 is installed, so that this may inhibit a sense of discomfort of the driver.

Herein, the time when the own vehicle C passes through the intersection where the traffic signal 100 is installed is intended to mean the time when the own vehicle C arrives at the position of the stop line before the traffic signal 100, the time immediately before the own vehicle C arrives at the stop line (when the own vehicle C arrives at the position a predetermined distance before the stop line), the time immediately after the own vehicle C arrives at the stop line (when the own vehicle C arrives at a position a predetermined distance beyond the stop line) and the like; this includes not only the time when the own vehicle C arrives at the stop line but also when this arrives at positions around the stop line within a predetermined distance. Meanwhile, a predetermined distance in this case indicates that of the position closer to the location where the traffic signal 100 is installed shorter than the above-described predetermined distance used when the display state of the traffic signal 100 is determined. The time when the own vehicle C passes through the intersection also includes the time when this enters the intersection.

REFERENCE SIGNS LIST

1 DRIVING ASSISTANCE SYSTEM
11 DRIVING ASSISTANCE ECU
12 VEHICLE CONTROL ECU
20 ASSISTANCE INSTRUMENT
21 DISPLAY DEVICE
22 ACOUSTIC DEVICE
23 CONTROL INSTRUMENT
31, 32 COMMUNICATING DEVICE
41 VEHICLE SPEED DETECTING DEVICE
51 OWN VEHICLE POSITION DETECTING DEVICE
52 MAP INFORMATION DATABASE
100 TRAFFIC SIGNAL
101 SIGNAL CONTROL DEVICE

The invention claimed is:

1. A driving assistance system comprising:
a stop assistance controller configured to perform stop assistance of an own vehicle;
an assistance necessity determining unit configured to determine whether it is necessary to perform the stop assistance of the own vehicle based on a stop determining position where it is determined whether to perform the stop assistance of the own vehicle and a predicted result of a display state of a traffic signal at a time the own vehicle arrives at the stop determining position; and
a determining position arithmetic unit configured to change the stop determining position according to a current display state of the traffic signal.

2. The driving assistance system according to claim 1, wherein the determining position arithmetic unit is configured to change the stop determining position to a position a predetermined distance before a position of a stop line at a time the current display state of the traffic signal is an entry prohibition state.

3. The driving assistance system according to claim 2, wherein the determining position arithmetic unit is configured to change the stop determining position further away from a stop line and closer to the own vehicle as a current speed of the own vehicle increases.

4. The driving assistance system according to claim 1, wherein the determining position arithmetic unit is configured to change the stop determining position more to a position further away from a stop line and closer to the own vehicle as a current speed of the own vehicle increases.

5. The driving assistance system according to claim 1, wherein the determining position arithmetic unit is configured to change the stop determining position to a position where a driver who recognizes the display state starts decelerating operation at a time the current display state of the traffic signal is an entry prohibition state.

6. A driving assistance system comprising:
an electronic control unit (ECU) configured to:
perform stop assistance of an own vehicle;
determine whether it is necessary to perform the stop assistance of the own vehicle based on a stop determining position where it is determined whether to perform the stop assistance of the own vehicle and a predicted result of a display state of a traffic signal at a time the own vehicle arrives at the stop determining position; and
change the stop determining position according to a current display state of the traffic signal.

7. The driving assistance system according to claim 6, wherein the ECU is configured to change the stop determining position to a position a predetermined distance before a position of a stop line at a time the current display state of the traffic signal is an entry prohibition state.

8. The driving assistance system according to claim 7, wherein the ECU is configured to change the stop determining position further away from a stop line and closer to the own vehicle as a current speed of the own vehicle increases.

9. The driving assistance system according to claim 6, wherein the ECU is configured to change the stop determining position more to a position further away from a stop line and closer to the own vehicle as a current speed of the own vehicle increases.

10. The driving assistance system according to claim 6, wherein the ECU is configured to change the stop determining position to a position where a driver who recognizes the display state starts decelerating operation at a time the current display state of the traffic signal is an entry prohibition state.

* * * * *